(12) United States Patent
Yoshikawa et al.

(10) Patent No.: US 7,611,195 B2
(45) Date of Patent: Nov. 3, 2009

(54) VEHICLE SEAT, MOTOR VEHICLE, AND AIRBAG MODULE

(75) Inventors: Hiromichi Yoshikawa, Minato-Ku (JP); Teruhiko Hiruta, Minato-Ku (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 11/678,241

(22) Filed: Feb. 23, 2007

(65) Prior Publication Data
US 2007/0216140 A1     Sep. 20, 2007

(30) Foreign Application Priority Data
Mar. 15, 2006   (JP)   ............... 2006-071162

(51) Int. Cl.
*B60N 2/427* (2006.01)
(52) U.S. Cl. ................................. 297/216.1
(58) Field of Classification Search ............ 297/284.11, 297/728.1, 216.1, 216.15
See application file for complete search history.

(56) References Cited

U.S. PATENT DOCUMENTS

| | | | | |
|---|---|---|---|---|
| 5,516,189 | A * | 5/1996 | Ligeras ................... | 297/180.11 |
| 5,992,882 | A * | 11/1999 | Ito et al. ................... | 280/743.1 |
| 6,095,602 | A * | 8/2000 | Umezawa et al. ......... | 297/216.1 |
| 6,543,803 | B1 * | 4/2003 | Harada et al. ............. | 280/730.2 |
| 6,578,866 | B2 * | 6/2003 | Higashi ..................... | 280/728.2 |
| 6,682,141 | B2 * | 1/2004 | Reynolds et al. ......... | 297/216.1 |
| 6,896,325 | B2 * | 5/2005 | Takedomi et al. ........ | 297/216.1 |
| 7,306,257 | B2 * | 12/2007 | Yoshikawa et al. ....... | 280/728.2 |
| 2001/0011810 | A1 * | 8/2001 | Saiguchi et al. .......... | 280/728.1 |
| 2002/0190548 | A1 * | 12/2002 | Ruel et al. ................ | 297/216.1 |
| 2003/0052519 | A1 * | 3/2003 | Reynolds et al. ......... | 297/216.1 |
| 2005/0046156 | A1 * | 3/2005 | Yoshikawa et al. ....... | 280/728.2 |
| 2006/0017266 | A1 * | 1/2006 | Yoshikawa et al. ....... | 280/730.1 |
| 2006/0138816 | A1 * | 6/2006 | Yoshikawa ............... | 297/216.1 |
| 2006/0175880 | A1 * | 8/2006 | Hiruta et al. ............. | 297/216.1 |
| 2007/0132214 | A1 * | 6/2007 | Suzuki et al. ............ | 280/730.1 |

FOREIGN PATENT DOCUMENTS

| | | |
|---|---|---|
| EP | 1623887 A2 | 2/2006 |
| JP | 5-229378 | 9/1993 |
| JP | 10217818 A | 8/1998 |
| JP | 2002079861 | 3/2002 |

* cited by examiner

*Primary Examiner*—David Dunn
*Assistant Examiner*—James Alex
(74) *Attorney, Agent, or Firm*—Fitch, Even, Tabin & Flannery

(57) ABSTRACT

A technology is provided effective for aiming at improving workability of an assembling work for assembling an airbag module at a vehicle seat main body side, in a vehicle seat, on which an airbag module is mounted having a construction in which an airbag is developed and expanded from a downside to an upside of a seat cushion against movement of a vehicle occupant in a condition of being seated in a vehicle seat toward a front side of a motor vehicle when accident occurs. The vehicle seat with respect to the present invention has a construction in which an airbag module is housed in a housing portion in a seat pan, and in which a through-hole, into which a harness that transmits an activation signal to a gas generator when accident occurs is inserted, is provided in the housing portion.

6 Claims, 12 Drawing Sheets

VEHICLE SEAT, MOTOR VEHICLE, AND
AIRBAG MODULE

FIELD OF INVENTION

The present invention relates to a vehicle seat, and more in detail, to a construction technology for a vehicle seat, on which an airbag module having a construction in which an airbag is developed and expanded from a downside to an upside of a seat cushion against movement of a vehicle occupant toward a front side of the motor vehicle in a seating condition of the vehicle occupant in a vehicle seat when an accident occurs, is mounted.

BACKGROUND OF THE INVENTION

Hitherto, in a seat belt-wearing condition in which a seat belt is worn by a vehicle occupant seated in a vehicle seat, various technologies for blocking occurrence of a phenomenon, i.e., a so-called submarine phenomenon, in which the vehicle occupant has a behavior to slip through a downside of a seat belt along a seat surface, along with a forward movement of a waist portion of the vehicle occupant when an accident occurs, is proposed. For example, in Japanese Unexamined Patent Application Publication No. 5-229378, a vehicle seat having a construction, in which an expanded airbag compresses a seat cushion from below so as to block the movement of the vehicle occupant toward a front side of the motor vehicle at the time when occurrence of the accident, is disclosed. However, in designing such a kind of vehicle seat, there is a demand, for a technology to aim at improving workability of an assembling work for assembling an airbag module at a vehicle main body side.

Accordingly, it is a problem in the present invention to provide a technology effective for aiming at improving workability of the assembling work for assembling the airbag module to the vehicle seat main body side in a vehicle seat on which an airbag module having a construction in which an airbag is developed and expanded from a downside to an upside of a seat cushion against movement of a vehicle occupant in a seating condition in a vehicle seat toward a front side of the motor vehicle when an accident occurs, is mounted.

SUMMARY OF THE INVENTION

To solve the aforementioned problems, the present invention is constructed. Incidentally, the present invention can be applied to a construction technology for a vehicle seat mounted on various kinds of motor vehicles, such as automobile motor vehicles, trucks, buses, electric trains, boats and ships, and so fourth.

The first form of the present invention for solving the aforementioned problems is a vehicle seat mounted on a motor vehicle, and constructed to be provided with at least a left side frame, a right side frame, a bracket, a seat pan, an airbag module, an activation signal transmitting section, and an opening portion.

The left side frame according to the present invention is configured to be a seat frame component extending in a front and back direction at a left side below a seat cushion in a seat frame forming a skeleton of a seat. The right side frame according to the present invention is configured to be a seat frame component extending in the front and back direction at a right side below the seat cushion in the seat frame forming the skeleton of the seat. A bracket according to the present invention is configured to be a seat frame component for connecting the left side frame and the right side frame below the seat cushion in the seat frame forming the skeleton of the seat. The bracket and the left side frame, and the bracket and the right side frame are typically, connected by welding, fastening with a bolt and a nut, or the like. A main body part of the vehicle seat is constructed by the seat frame.

The seat pan according to the present invention is configured to have a construction being disposed below the seat cushion between the left side frame and the right side frame, and above or at a rear side of the bracket adjacent thereto, and including an airbag module housing portion. The "seat pan" according to the present invention is defined as a member constituting a seat bottom surface of the vehicle seat, and specifically, can also be defined as a seat cushion panel, a seat cushion frame, or a seat cushion board, that receives the seat cushion. With regard to a disposition of the seat pan, it is sufficient when entire, or a part of the seat pan is disposed between the left side frame and the right side frame. A construction in which the seat pan is fixed to the left side frame and the right side frame in a manner so as to be hung across by welding, fastening by a bolt and a nut, or the like, or a construction in which the seat pan is fixed to a member situated between the left side frame and the right side frame by welding, fastening of a bolt and a nut, or the like, can be adopted. Further, in the present invention, it is sufficient when the seat pan at least includes a portion being disposed above or at the rear side of the bracket adjacent thereto.

The airbag module according to the present invention is provided with an airbag and a gas generator, and is housed in the airbag module housing portion. In addition, the airbag module is constructed to be set to be such that the airbag is developed and expanded from a downside to an upside of a seat cushion against a forward movement of a vehicle occupant seated in a vehicle seat toward a front side of a motor vehicle when an accident occurs by supplying airbag-expansion gas generated by activation of the gas generator. The airbag module can also be called as an "airbag apparatus" or an "occupant restraint apparatus".

The activation signal transmitting section according to the present invention is provided with an elongated harness and a to-be-connected portion to which the harness is connected at a gas generator side, and is further provided with a function for transmitting an activation signal to the gas generator when the accident occurs. Accordingly, a signal outputted from a vehicle side in a case that the occurrence of the accidents is detected is transmitted to the elongated harness and the to-be-connected portion at the gas generator side, thereby the gas generator is activated. Incidentally, a connecting operation between the elongated harness and the to-be-connected portion at the gas generator side may previously be performed before an assembling work to assemble the airbag module at the vehicle main body side, or may be performed at the time of the assembling work or after the assembling work. At this moment, with regard to the connecting configuration between the harness and the to-be-connected portion, the connecting configuration may have a detachable construction or an undetachable construction. Further, in the present invention, an entire or a part of the activation signal transmitting section is typically included in the airbag module.

The opening portion according to the present invention is provided at the airbag module housing portion of the seat pan in an opening like shape, and constructed to be a portion that allows the activation signal transmitting section to extend adjacent to the bracket toward outside of the seat pan. An object to be inserted into the opening portion includes each portion of the activation signal transmitting section. The elongated harness and the to-be-connected portion of the harness at the gas generator side is typically configured to be the object to be inserted into the opening portion. With regard to a concrete construction of the opening portion, a construction such as, a through-hole provided at a wall surface of the airbag module housing portion in a penetrated manner, a notched opening provided in a notched manner, a slit, a groove, or the like can appropriately be adopted.

According to a construction as described above, the activation signal transmitting section can easily be inserted into the opening portion along an operation for housing the airbag module in the airbag module housing portion at a work for assembling the airbag module to the vehicle main body side, by providing the opening portion in the airbag module housing portion in which the airbag module is housed. Thereby, the activation signal transmitting section, specifically, the elongated harness is hard to interfere (block) an assembling work thereafter. Further, in a case that the elongated harness is inserted into the opening portion, it is rational because there is no need to pull around the harness, which extends in a lengthy manner between the gas generator in a condition being housed in the airbag module housing portion and a vehicle-side connecting portion, from the airbag module housing portion toward outside thereof. Further, in a case that the to-be-connected portion at the gas generator side is inserted into the opening portion, it is enabled to easily connect the elongated harness to the to-be-connected portion from the outside of the housing portion.

Therefore, in accordance with the invention according to the first form, a vehicle seat capable of being aimed at improving workability of the assembling work for assembling the airbag module to the vehicle seat main body side is provided.

Incidentally, in the present invention, with regard to the opening square measure of the opening portion, it is preferable to make a design therefor which is suppressed as much as possible within a limit not to interfere a smooth inserting work for the activation signal transmitting section. According to such a construction described above, the airbag-expansion gas generated by the activation of the gas generator is enabled to be suppressed to be leaked from a space partitioned by the airbag module housing portion and the airbag cover that covers the housing portion toward an outside of the space, as much as possible.

The second form of the present invention for solving the aforementioned problems is the vehicle seat having the opening portion according to the first form constructed as a through-hole provided in a manner so as to be penetrated through an attaching wall surface of the airbag module housing portion where the airbag module is attached in a housed condition in which the airbag module is housed in the airbag module housing portion.

According to such a construction as described above, in the housed condition of the airbag module, a distance between the airbag module and the through-hole can be suppressed, and it is enabled to perform a rational disposition of the activation signal transmitting section at the airbag module housing portion.

The third form of the present invention for solving the aforementioned problems is the vehicle seat provided with a retainer for housing the gas generator in the airbag module, a together-fastening member for fastening the seat pan and the bracket together and fixing the same, in either one of the first or second forms. Typically, by use of the together-fastening member, such as fastening with the bolt and nut, rivet, and so forth, it becomes enabled to perform a together fastening and fixing operation. Further, the opening portion is provided at the wall surface of each of the retainer, the seat pan, and the bracket being in close contact with each other by the together-fastening member. Since the board thicknesses of portions to be in close contact with each other is suppressed, a length with regard to a penetrating direction (conformed to a board thickness direction) of the through-hole can be suppressed and it is enabled to easily perform the inserting work for the activation signal transmitting section for inserting the same into the through-hole.

The fourth form of the present invention for solving the aforementioned problems is a motor vehicle that at least includes a vehicle seat and a seat belt for restraining the vehicle occupant seated in the vehicle seat according to any one of the first through third forms. Further, the motor vehicle has a construction, in which in a seat belt-wearing condition in which the seat belt is worn by the vehicle occupant seated in the vehicle seat, occurrence of a movement of the vehicle occupant to slip through a downside of a seat belt along a seat surface, associated with a forward movement of a waist portion of the vehicle occupant when the accident occurs, i.e., a so-called submarine phenomenon, is blocked by the airbag module mounted on the vehicle seat.

Therefore, in accordance with the invention according to the fourth form, a motor vehicle capable of being aimed at improving the workability of the assembling work for assembling the airbag module at the vehicle seat main body side is provided.

The fifth form of the present invention for solving the aforementioned problems is an airbag module having the construction substantially similar to the airbag module serving as a component of the vehicle seat according to the first form.

Therefore, in accordance with the invention according to the fifth form, an airbag module capable of being aimed at improving the workability of the assembling work for assembling the airbag module at the vehicle seat main body side is provided.

As described above, according to the present invention, in the vehicle seat on which an airbag module having the construction in which the airbag is developed and expanded from the downside to the upside of the seat cushion against the movement of the vehicle occupant in the forward direction of the motor vehicle in the seat condition in the vehicle seat when the accident occurs, it becomes capable of aiming at improving the workability of the assembling work for assembling the airbag module to the vehicle seat main body side by providing an opening portion, into which the activation signal transmitting section is inserted for transmitting an activation signal to the gas generator when the accident occurs, specifically, in the airbag module housing portion for housing the airbag module.

DETAILED DESCRIPTION OF THE PREFERRED EMBODIMENTS

Figure 1:
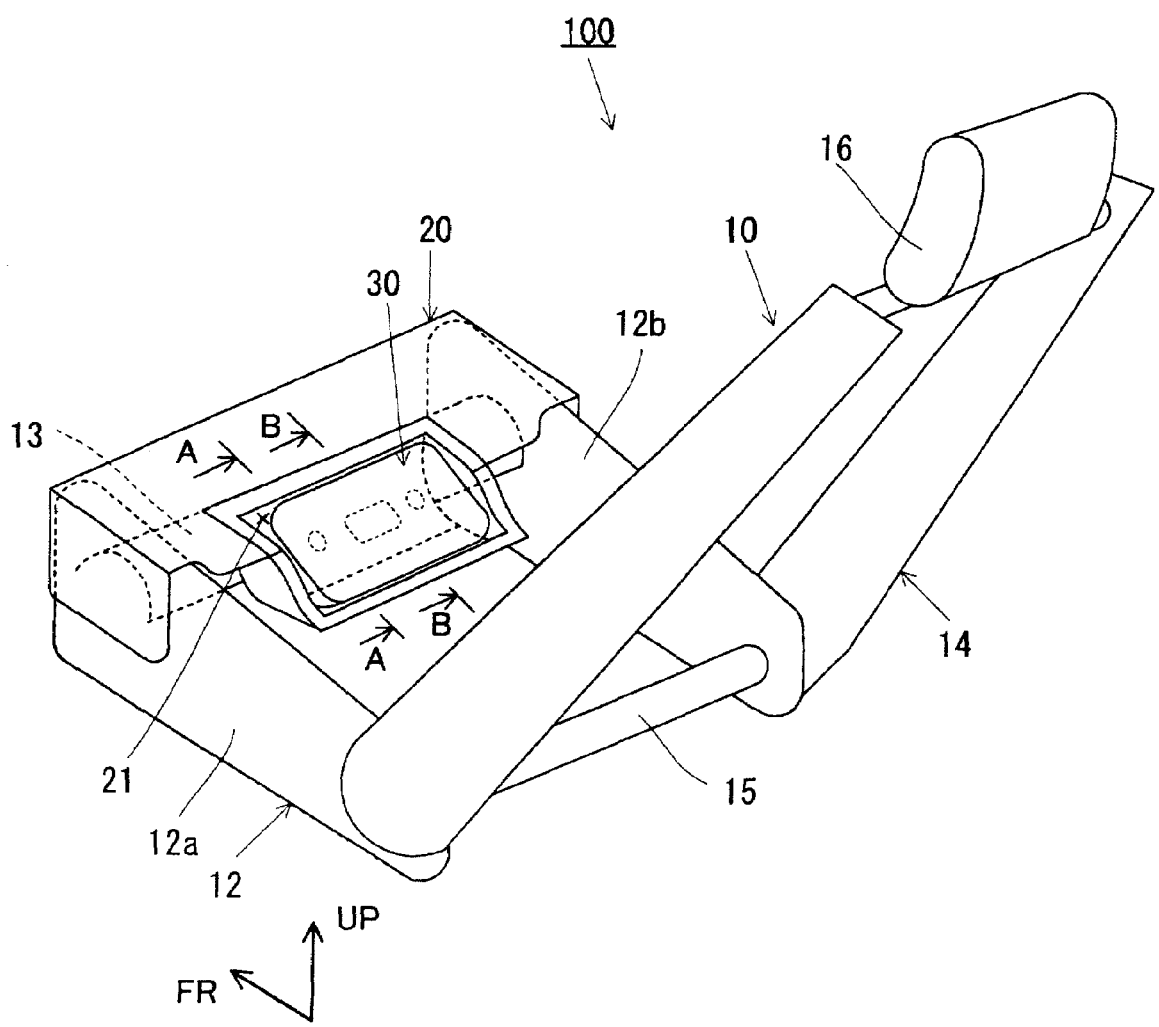
FIG. 1 is a view showing an internal structure of a vehicle seat 100 in the present embodiment and is a perspective view looking from diagonal backside of the motor vehicle.
Figure 2:
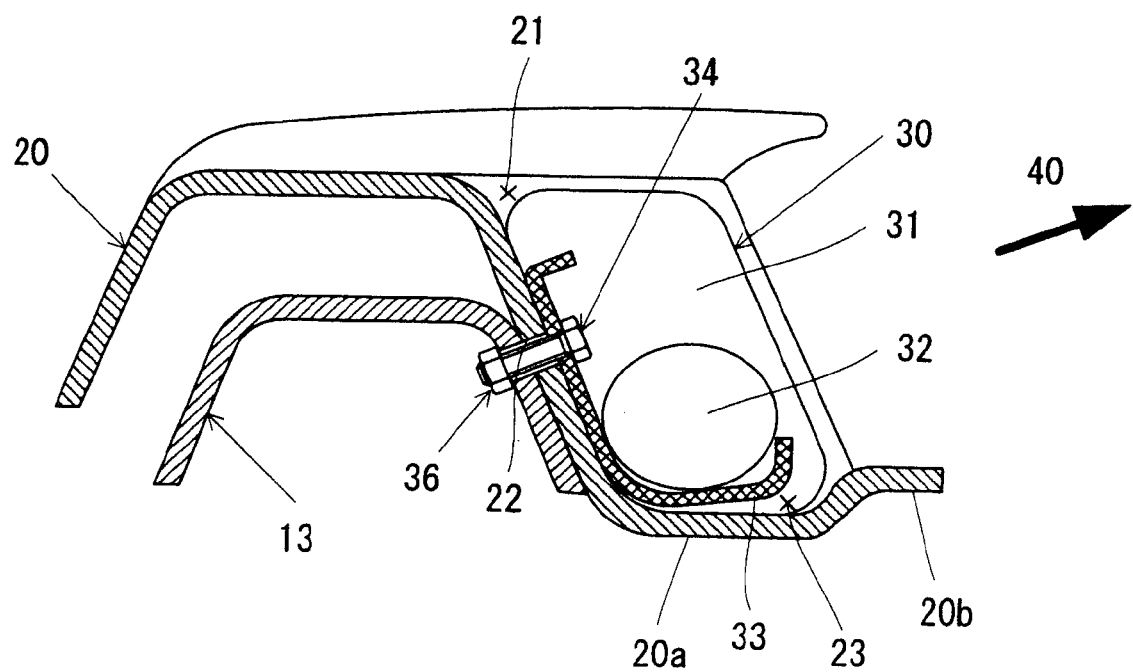
FIG. 2 is a cross-section along a line A-A in FIG. 1.
Figure 3:
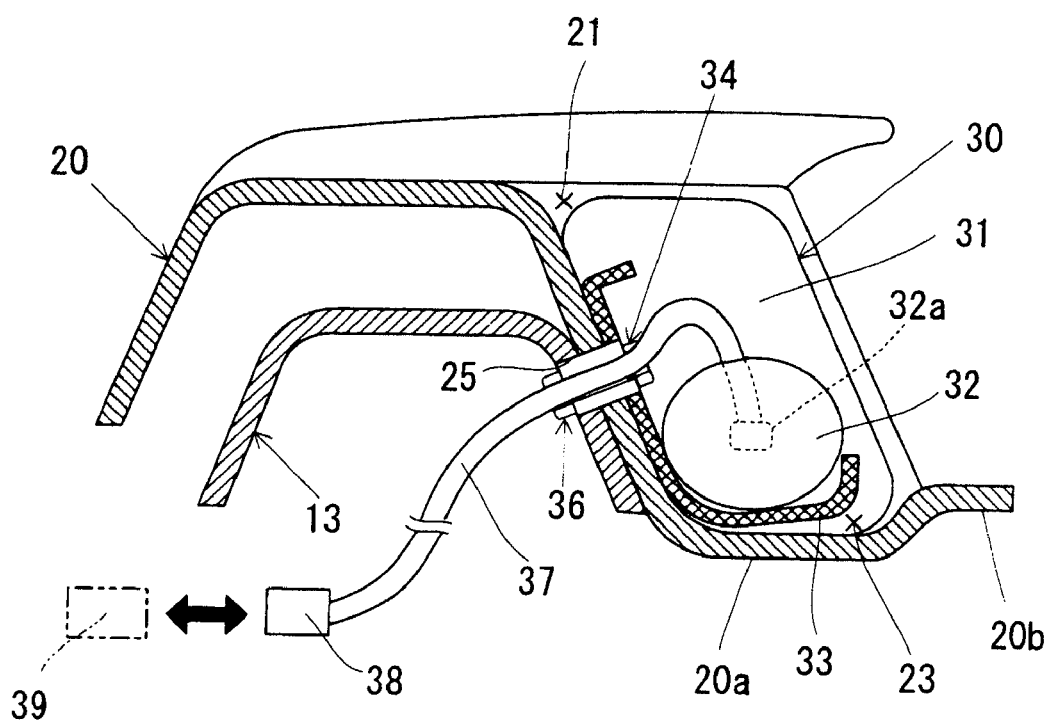
FIG. 3 is a cross-section along a line B-B in FIG. 1.

Hereinbelow, an embodiment of the present invention will be explained in detail referring to the drawings. Firstly, a construction of a vehicle seat 100 as an embodiment of a "vehicle seat" with respect to the present invention will be explained referring to FIGS. 1 through 3. At this moment, FIG. 1 is a view showing an internal structure of the vehicle seat 100 according to the present embodiment, and is a perspective view looking from diagonal backside of the motor vehicle. FIG. 2 is a cross-section at a line A-A in FIG. 1. FIG. 3 is a cross-section at a line B-B in FIG. 1.

As shown in FIG. 1, the vehicle seat 100 according to the present embodiment is a vehicle seat to be mounted on a motor vehicle, and is mainly constructed of a seat frame 10, a seat pan 20, and an airbag module 30. The vehicle seat 100 is constructed to serve as a driver's seat where a driver is seated, or a passenger seat. Further, in the motor vehicle on which the vehicle seat 100 is mounted, a seatbelt (corresponds to a "seatbelt" in the present invention) to be worn by an occupant seated in the vehicle seat 100 is further mounted. Incidentally, a direction indicated by "FR" in FIG. 1 represents a front side of the motor vehicle, and that indicated by "UP" represents an upside of the motor vehicle.

The seat frame 10 is constructed to serve as a frame that forms a skeleton portion of the vehicle seat 100, and is at least provided with a base frame 12 and a back frame 14. The seat frame 10 corresponds to a "seat frame" in the present invention. On the base frame 12, a seat cushion (not shown) formed from a material having plasticity, such as a urethane material, or the like, is mounted, and the seat cushion constitutes a seat surface of the vehicle seat 100. Further, on the back frame 14, a seat back (not shown) formed from a material having plasticity, such as a urethane material, or the like, is mounted, and the seat back constitutes a back surface of the vehicle seat 100. Furthermore, an outer surface of each of the seat cushion and the back seat is covered with scurf skin (not shown) formed from leather, cloth, or the like.

The base frame 12 is a frame to be disposed below the seat cushion, and is provided with a left-and-right pair of side frames, 12a and 12b (a left side frame 12a, and a right side frame 12b), extending in a front and back direction of the vehicle seat 100 (conforming to a front and back direction of the motor vehicle). The left side frame 12a mentioned here corresponds to a "left side frame" in the present invention, and the right side frame 12b corresponds to a "right side frame" in the present invention.

Further, at an upper portion side of the base frame 12, a bracket 13 for reinforcement is provided so as to hang across the left and right side frames, 12a and 12b. The bracket 13 is constructed to be a plate shape (a curved plate shape in FIG. 1) having a predetermined board thickness, and is connected to the left and right side frames, 12a and 12b, by means of a welding process, a fastening process with a bolt and a nut, or the like. This bracket 13 serves as a supporting member for supporting the seat pan 20, and is constructed to serve as a holding member for connecting and holding the left and right side frames, 12a and 12b. In addition, the bracket 13 also serves as a positioning member when joining the left and right side frames, 12a and 12b, resulting in providing a good assembling capability. This bracket 13 corresponds to a "bracket" in the present invention.

The back frame 14 is a frame that is rotatably connected to the base frame 12 via a supporting shaft 15 and a reclining device (not shown). At an upper part of the back frame 14, a head rest 16 is attached to a position corresponding to a head portion of a vehicle occupant.

The seat pan 20 is provided so as to hang across the left-and-right pair of the side frames, 12a and 12b in a manner so as to cover the same from above, at a portion above the bracket 13 and below the seat cushion, and so as to be adjacent to the bracket above or at a rear side of the bracket. The seat pan 20 is a member constituting a seat bottom surface of the vehicle seat 100, and specifically, can also be defined as a seat cushion panel that receives the seat cushion, a seat cushion frame, or a seat cushion board. Although described later in detail, the seat pan 20 is attached to the bracket 13 by means of the fastening process with the bolt and nut at two places. The seat pan 20 can also be joined to the left and right side frames, 12a and 12b, by means of the welding process or the fastening process with the bolt and nut. The seat pan 20 has a function to receive a load from the seat cushion. The seat pan 20 corresponds to a "seat pan" in the present invention. The seat pan 20 at least includes a portion being disposed above or at the rear side of the bracket adjacent thereto in the present invention.

Further, in the seat pan 20, a housing portion 21 for housing the airbag module 30 is provided. The housing portion 21 corresponds to an "airbag module housing portion" in the present invention. In the present embodiment, the housing portion 21 is constructed to have a hollow portion 23 (sometimes called as "concave portion", "cavity portion", or "concave area") that is downwardly hollowed. The hollow portion 23 is configured to be a portion where the airbag module 30 can be held by the hollow portion 23.

As shown in FIG. 2, the housing portion 21 is provided with a first extension portion 20a constituting a bottom surface of the hollow portion 23, and a second extension portion 20b extending to a rear side (right side in FIG. 2) in relation to the first extension portion 20a. A step portion (step shape) is formed by means of a difference of elevation in an upper and lower direction between the first extension portion 20a and the second extension portion 20b. In concrete terms, the construction is made such that the first extension portion 20a is extending at a portion lower than the second extension portion 20b. Further, the housing portion 21 is opened diagonally upward toward the backside. Accordingly, a developing direction (sometimes called "protruding direction") of an airbag (airbag 31 described later) of the airbag module 30 is configured to be a diagonally upward and backward direction, as a direction indicated by an arrow 40 in FIG. 2. Although described later in detail, according to a present construction, a work for housing the airbag module 30 in the housing portion 21, and a work for attaching and fixing the airbag module 30 to a seat pan 20 side is aimed at facilitating by means of a holding function (or a positioning function) of the airbag module 30 provided by the hollow portion 23 that is caved downward.

Further, according to the present construction, when the airbag module 30 is held at a proper position in the hollow portion 23, the airbag module 30 in the held condition is configured to be positioned at a front side in relation to the step portion between the first extension portion 20a and the second extension portion 20b. Accordingly, a protrusion of the airbag module 30 toward a second extension portion 20b side can be discriminated on the basis of a result of a visible confirmation between a first condition in which the airbag module 30 held by the hollow portion 23 covers the step portion and a second condition in which the covering operation is released. That is, a case, in which an entire step portion or a part of the step portion cannot be visibly confirmed, represents the first condition in which the airbag module 30 covers the step portion, and this results in that a rear end surface of the airbag module 30 is discriminated to be protruded out to the second extension portion 20b side across the step portion. At this moment, the airbag module 30 can be judged not to be located at a proper position. On the other hand, a case, in which the entire step portion can be visibly confirmed, represents the second condition in which the airbag module 30 does not cover the step portion, and this results in that the rear end surface of the airbag module 30 is discriminated not to be protruded out to the second extension portion 20b side across the step portion. At this moment, the airbag module 30 can be judged to be located at the proper position. By discriminating the protrusion of the airbag module 30 toward the second extension portion 20b side, it becomes to be enabled to prevent the airbag module 30 from being pinched by an airbag cover (not shown) that covers the housing portion 21. With regard to visibility of the step portion, the visibility of the step portion can be aimed at being further improved by forming a colored line at the step portion.

Incidentally, the housing portion 21 of the seat pan 20 in the present embodiment has a construction including a hollow portion 23 that is caved downward. Therefore, the airbag module 30 in the housed condition (non-operating time) is aimed at being protected. Further, an airbag cover (not shown) that covers the housing portion 21 in a condition, in which the airbag module 30 is housed therein, is mounted on the seat pan 20, and protection for the airbag module 30 in the condition being housed by the airbag cover is aimed at being further improved.

As shown in FIGS. 2 and 3, the airbag module 30 at least includes an airbag 31, a gas generator (sometimes called as, inflator) 32, a retainer 33, and a harness 37. The airbag module 30 corresponds to an "airbag module" in the present invention.

The airbag 31 is constructed as an airbag element that is folded back in a predetermined folding configuration and housed, and that is developed and expanded by airbag-expansion gas generated by the activation of the gas generator 32 and supplied to the airbag element when an accident occurs. In concrete terms, the airbag 31 is developed and expanded from a downside to an upside of a seat cushion against movement of a vehicle occupant toward a front side of the motor vehicle in a seating condition of the vehicle occupant in a vehicle seat when the accident occurs. Thereby, in a seatbelt-wearing condition in which a seatbelt is worn by a vehicle occupant seated in a vehicle seat 100, a phenomenon, i.e., a so-called submarine phenomenon, in which the vehicle occupant has a behavior to slip through a downside of a seatbelt along a seat surface, along with a frontward movement of a waist portion of the vehicle occupant when the accident occurs, is blocked or suppressed. The airbag 31 mentioned here corresponds to an "airbag" in the present invention, and the gas generator 32 corresponds to a "gas generator" in the present invention.

The retainer 33 is constructed to serve as a member for housing the gas generator 32. The retainer 33 corresponds to a "retainer" in the present invention. A fixing bolt 34 for attaching and fixing the airbag module 30 to the base frame 12 side is provided in the retainer 33. The airbag module 30 is attached and fixed to the base frame 12 side by means of the fixing bolt 34. In concrete terms, the fixing bolt 34 is configured to be able to be inserted into a through-hole 22 penetrating through the seat pan 20, the bracket 13 and the airbag 31 in a condition in which the airbag module 30 is housed in the housing portion 21 of the seat pan 20. Accordingly, three members of the retainer 33, the seat pan 20, and the bracket 13 are integrally formed by being fixed to each other by being fastened together (sometimes called as "fixing by together-fastening") by fastening (screwing) the fixing bolt 34 penetrated through the through-hole 22, and the nut 36 with each other. In this case, the nut 36 may be constructed as a separate body from the bracket 13, or may have a construction in which the nut 36 is integrally jointed with the bracket 13. Further, a shape of a round hole, a long hole, a slit, or the like can appropriately be selected as the through-hole 22. The fixing bolt 34 and the nut 36 mentioned here correspond to a "together-fastening member" in the present invention.

Incidentally, the present embodiment is constructed such that an extending direction of a bolt axis of the fixing bolt 34 is approximately conformed to a developing direction of the airbag 31 along a direction indicated by an arrow 40 in FIG. 2. According to such a construction, it is enabled that fastening force of the fixing bolt 34 is effectively used as force against an airbag load when the airbag is developed and expanded.

The harness 37 is constructed as a harness for transmitting an activation signal (sometimes called as a "control signal") to the gas generator 32 when the accident occurs. In concrete terms, as shown in FIG. 3, the harness 37 is extended in an elongated manner from a gas-generator-side connector portion 32a of the gas generator 32 up to a vehicle-side connector portion 38 passing through a through-hole 25. The harness 37 is extended between the gas generator 32 and the vehicle-side connecting portion 39 by means of that the vehicle-side connector portion 38 is connected to the vehicle-side connecting portion 39. The harness 37 corresponds to an "elongated harness" in the present invention. Further, the gas-generator-side connector portion 32a is a to-be-connected portion to which the harness is connected at the gas generator 32 side, and corresponds to a "to-be-connected portion" in the present invention. Further, an "activation signal transmitting section" in the present invention is constructed by the harness 37 and the gas-generator-side connector portion 32a.

The through-hole 25 is an opening portion for penetrating the retainer 33, the airbag 31, the seat pan 20, and the bracket 13, and is constructed so as for the harness 37 to be inserted at a time of assembling work for the airbag module 30 to the vehicle seat main body. Further, the through-hole 25 is constructed as a portion allowing the harness 37 to be expanded toward outside of the seat pan 20 while being in close contact with the bracket 13. The through-hole 25 corresponds to an "opening portion" in the present invention. Furthermore, the through-hole 25 is provided in an opening shape in the housing portion 21 in each portion in the seat pan 20, and in concrete terms, in the attaching wall surface to which the airbag 31 is attached. In such a construction as described above, a distance between the airbag 31 and the through-hole 25 can be suppressed and it becomes capable of performing a rational disposition of the housing portion 21 and the harness 37.

Further, in the present embodiment, as described above, the through-hole 25 is provided at a wall surface of each of the retainer 33, the seat pan 20, and the bracket 13 being in close contact with each other by the together fastening operation by the fixing bolt 34 and the nut 36. In such a construction as described above, since the board thickness of the portions being in close contact with each other is suppressed, the length with regard to the penetrating direction (conformed to the board thickness direction) of the through-hole 25 can be suppressed, and an inserting work for inserting the harness 37 into the through-hole 25 can easily be performed.

Incidentally, in the present embodiment, it is preferable for the through-hole 25 to make a design for an opening square measure to be suppressed as much as possible within a limit not to interfere a smooth inserting work for the vehicle-side connector portion 38 and the harness 37. According to such a construction described above, the airbag-expansion gas generated by the activation of the gas generator 32 is enabled to be suppressed to be leaked from a space partitioned by the housing portion 21 and the airbag cover (not shown) that covers the housing portion 21 toward an outside of the space, as much as possible.

Further, in the present embodiment, it is preferable to make a design in which a sealing member (sometimes called as a "grommet for harness") formed from a rubber material or a resin material is intervened in a close contacting manner between the through-hole 25 and the harness 37 inserted into the through-hole 25. According to such a construction as described above, in addition to that the harness 37 can stably be held in the through-hole 25, a waterproof effect can be realized with regard to water intruding into the housing portion 21 through the through-hole 25 or other portion, and it is effective for the airbag module 30 housed in the housing portion 21, and specifically, for the airbag 31 to be prevented from getting wet by moisture or water.

A work for housing the airbag module 30 in the present embodiment, specifically, a work for housing the airbag module 30 in the housing portion 21 of the seat pan 20, and a work for attaching and fixing the airbag module 30 to the seat pan 20 side will be explained referring to FIGS. 4 through 7.

Figure 4:
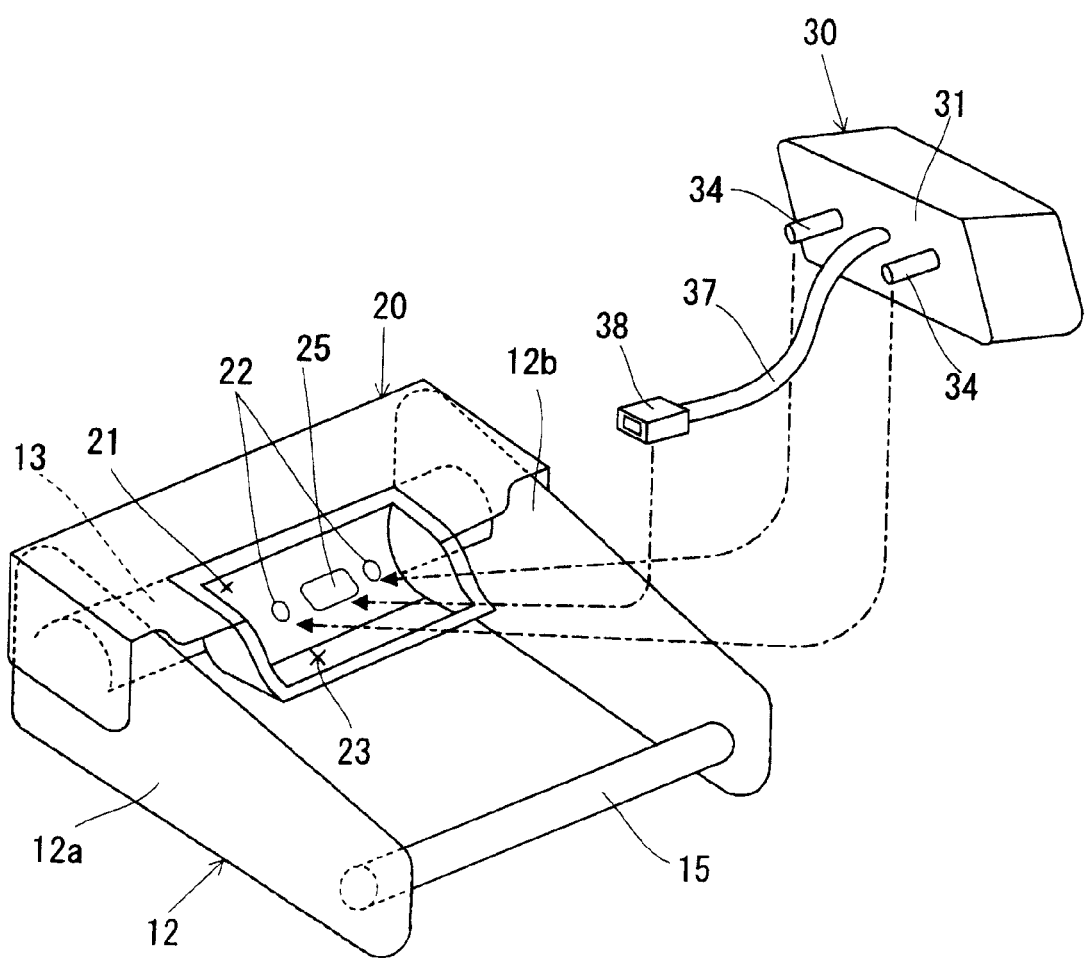
FIG. 4 is a perspective view schematically showing a work for housing an airbag module 30 into a housing portion 21 of a seat pan 20.

FIG. 4 is a perspective view schematically showing a work for housing the airbag module 30 in the housing portion 21 of the seat pan 20. As shown in FIG. 4, in the housing work for the airbag module 30, firstly, the airbag module 30 is moved to the housing portion 21 in a manner for the fixing bolt 34 at the airbag module 30 side to be headed toward the housing portion 21 of the seat pan 20. Further, the harness 37 is inserted into the through-hole 25 of the housing portion 21 from a vehicle-side connector portion 38 side, i.e., a tip end of the harness 37. In the present embodiment, since the construction is formed such that the housing portion 21 is provided with the through-hole 25, the harness 37 can be inserted into the through-hole 25 along an operation for housing the airbag module 30 in the housing portion 21, and the elongated harness 37 is hard to interfere (block) the assembling work thereafter. Accordingly, it is enabled to be aimed at facilitating the assembling work for the airbag module 30.

Further, since there is no need to pull around the harness 37 extending in an elongated manner between the gas generator 32 in a condition of being housed in the housing portion 21 and the vehicle side connecting portion 39, from the housing portion 21 to the outside of the housing portion 21, it is rational.

Figure 5:
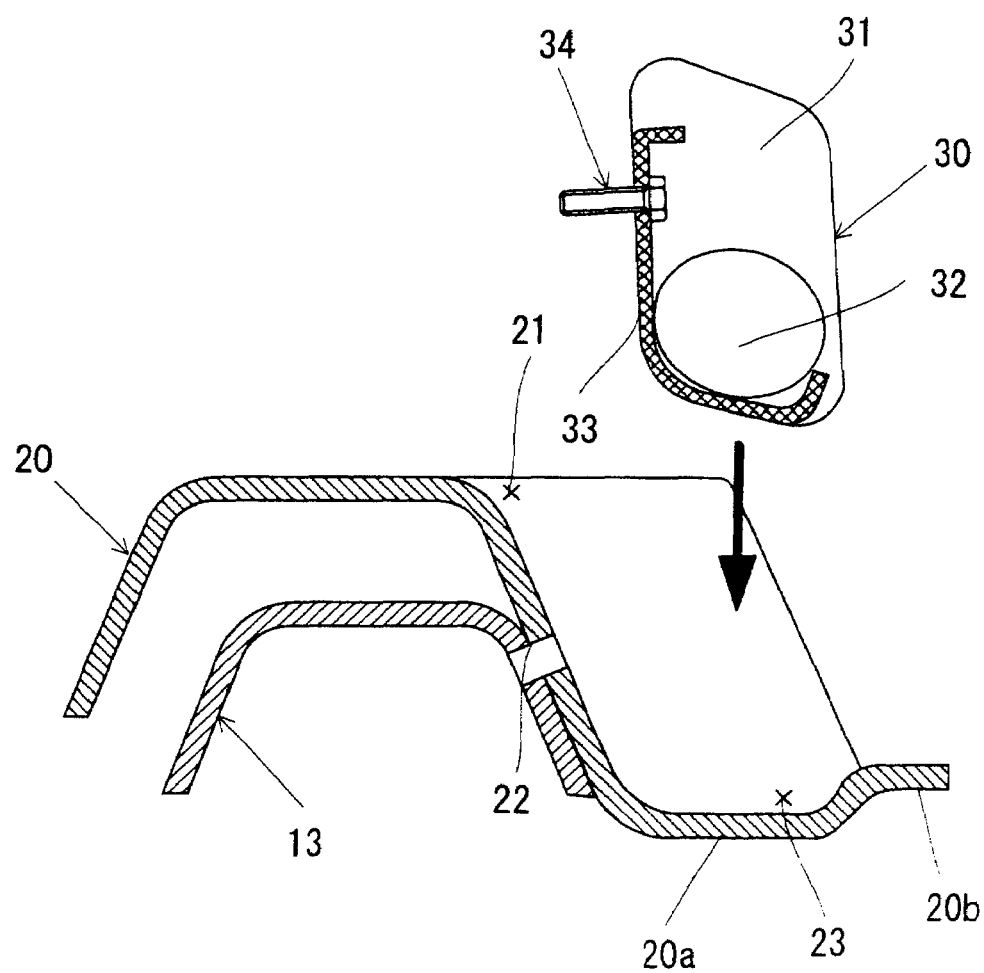
FIG. 5 is a cross-section showing a process for attaching and fixing the airbag module 30 into the housing portion 21 of the seat pan 20.
Figure 6:
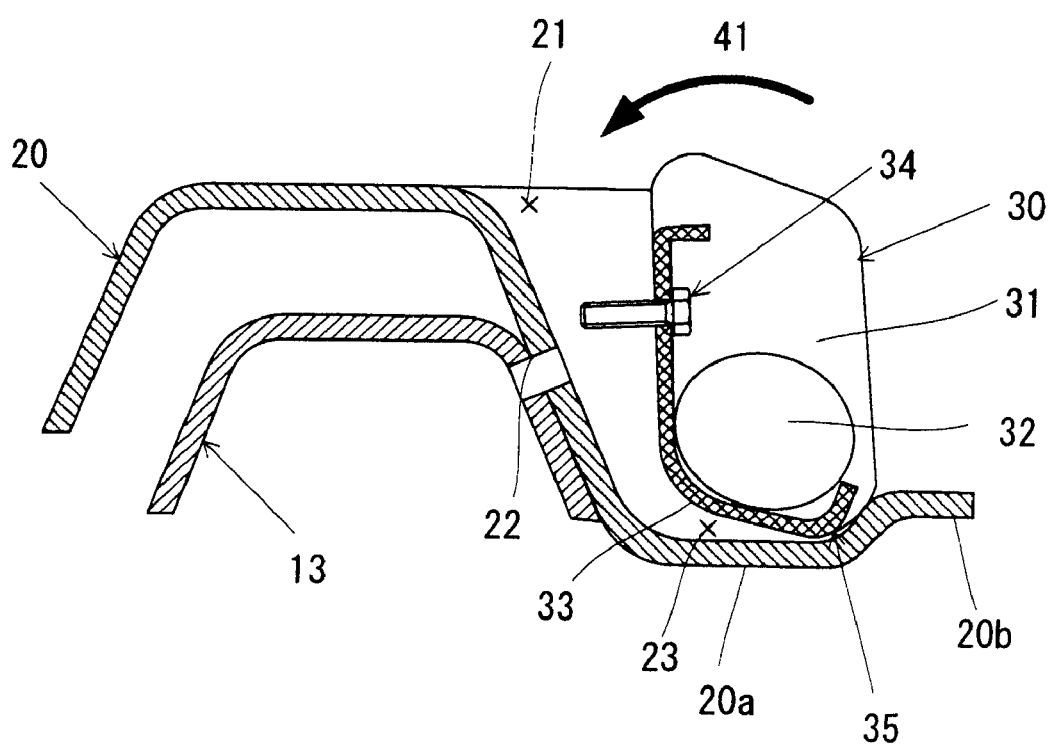
FIG. 6 is a cross-section showing a process for attaching and fixing the airbag module 30 into the housing portion 21 of the seat pan 20.
Figure 7:
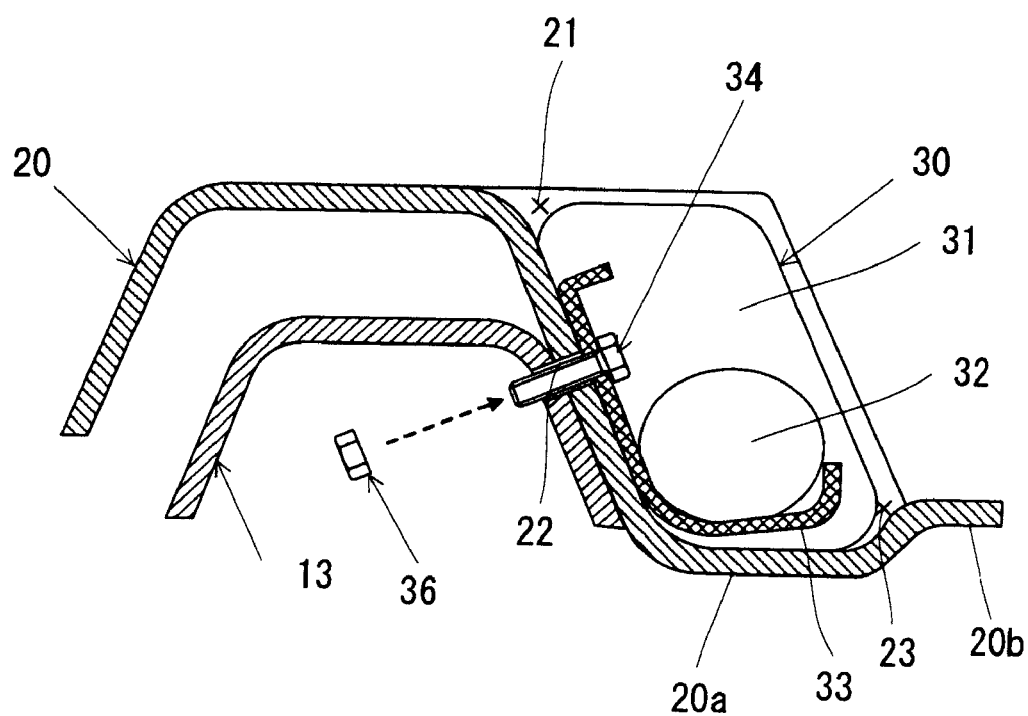
FIG. 7 is a cross-section showing the process for attaching and fixing the airbag module 30 into the housing portion 21 of the seat pan 20.

Continuously, with regard to the work until the airbag module 30 is attached and fixed to the seat pan 20 side, the same can be performed by at least using, for example, three steps shown in FIG. 5 through FIG. 7. At this moment, any of FIG. 5 through FIG. 7 is a cross-section showing a process for attaching and fixing the airbag module 30 to the housing portion 21 of the seat pan 20.

As shown in FIG. 5, in the first step, the airbag module 30 is inserted toward the hollow portion 23 (the first extension portion 20a) from above the seat pan 20, in a condition of being headed so as for a gas generator 32 side to be situated at a downside. At this time, the airbag module 30 can be easily introduced into the hollow portion 23 along a concaved shape of the hollow portion 23. Thereby, a provisionally held condition of the airbag module 30 shown in FIG. 6 is formed. At this moment, the bolt axis of the fixing bolt 34 is extended approximately in a left-and-right direction.

Next, as shown in FIG. 6, in the second step, the airbag module 30 is rotated in a direction indicated by an arrow 41 in FIG. 6 around the step portion as a pivot fulcrum, in a condition in which a module lower portion 35 of the airbag module 30 in a provisionally held condition is in contact with the step portion between the first extension portion 20a and the second extension portion 20b. Further, the fixing bole 34 is caused to be in close contact with the through-hole 22 by the rotation. Thereby, an inserting condition where the fixing bolt 34 is inserted into the through-hole 22 is formed, as shown in FIG. 7. In consideration of ease of insertion for the fixing bolt 34, it is preferable to use an elongate hole extending in an upper and lower direction, as the through-hole 22.

At the last, as shown in FIG. 7, in the third step, by fastening the fixing bolt 34 and the nut 36 with each other, an integrally formed condition (the condition shown in FIG. 2) where the retainer 33, the seat pan 20, and the bracket 13 are fastened and fixed to each other, is formed. At this moment, the airbag module 30, the seat pan 20 and the bracket 13 are fastened together and fixed by the fixing bolt 34, whereby pressure caused at the time when the airbag 31 is developed and expanded when the accident occurs, namely a load generated when the airbag module 30 is operated is to be received by the seat pan 20 and the bracket 13 that are integrally formed by being fastened and fixed together.

At this moment, since strength of the seat pan 20 can be raised by means of that a board thickness of the bracket 13 that is fastened and fixed together to the seat pan 20 is added to a board thickness of the seat pan 20, it is enabled that the strength required for the vehicle seat 100 is secured, upon suppressing the board thickness of the seat pan 20 in this extent. That is, the strength of the vehicle seat 100 can be secured while aiming at weight saving for the vehicle seat 100 by means of a cooperative work among the retainer 33, the seat pan 20, and the bracket 13. Incidentally, in a case that a specification, in which the board thickness of the seat pan 20 is suppressed, is considered, with regard to a board thickness, d1, of the seat pan 20, and a board thickness, d2, of the bracket 13, it is preferable to set the same on the basis of a relationship expressed by an inequality, $d1 \leq d2$.

Further, occurrence of an abnormal noise due to contact or the like of the seat pan 20 and the bracket 13 can be prevented by fastening and fixing together, and seating comfortableness of the vehicle seat 100 can be improved by raising the strength of the seat pan 20.

Furthermore, since the seat pan 20 is constructed to be fixed to the bracket 13 by together fastening and fixing, and the seat pan 20 is not required to be fixed to the left side frame 12a and the right side frame 12b by welding or the like, a manufacturing process of the vehicle seat 100 can be simplified.

By performing the aforementioned first to the third steps in the order, the work for attaching and fixing the airbag module 30 to the seat pan 20 side is facilitated. Specifically, in the second and third steps, the module lower portion 35 of the airbag module 30 held by the hollow portion 23 is caused to come into contact with the step portion between the first extension portion 20a and the second extension portion 20b from beginning to end during the time until the airbag module 30 is fastened to the seat pan 20 side by means of the fixing bolt 34. Since the airbag module 30 is thereby positioned, it is enabled to aim at improving an assembling capability of the airbag module 30.

Incidentally, the present invention is not limited to the aforementioned embodiment, and various applications and modifications are considered. For example, the following each embodiment, to which the aforementioned embodiment is applied, can be performed.

The construction of the seat pan 20 and the airbag module 30 in the aforementioned embodiment can appropriately be changed as needed. For example, each embodiment shown in FIG. 8 through FIG. 12 can also be adopted.

Figure 8:
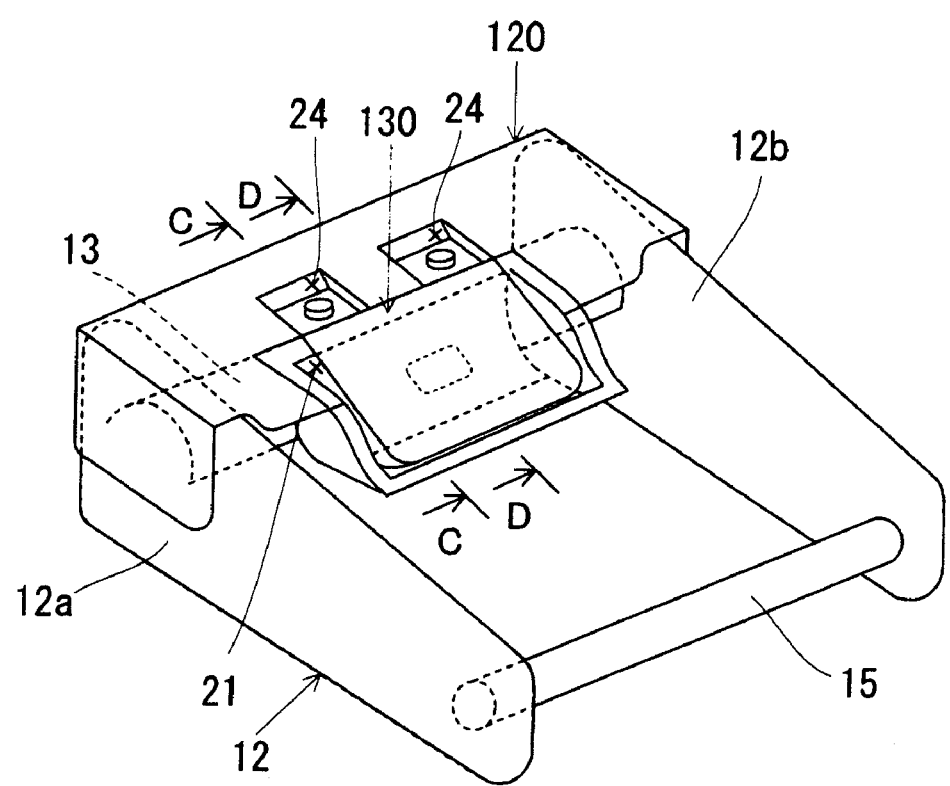
FIG. 8 is a perspective view showing a construction of a seat pan 120 and an airbag module 130 in another embodiment.
Figure 9:
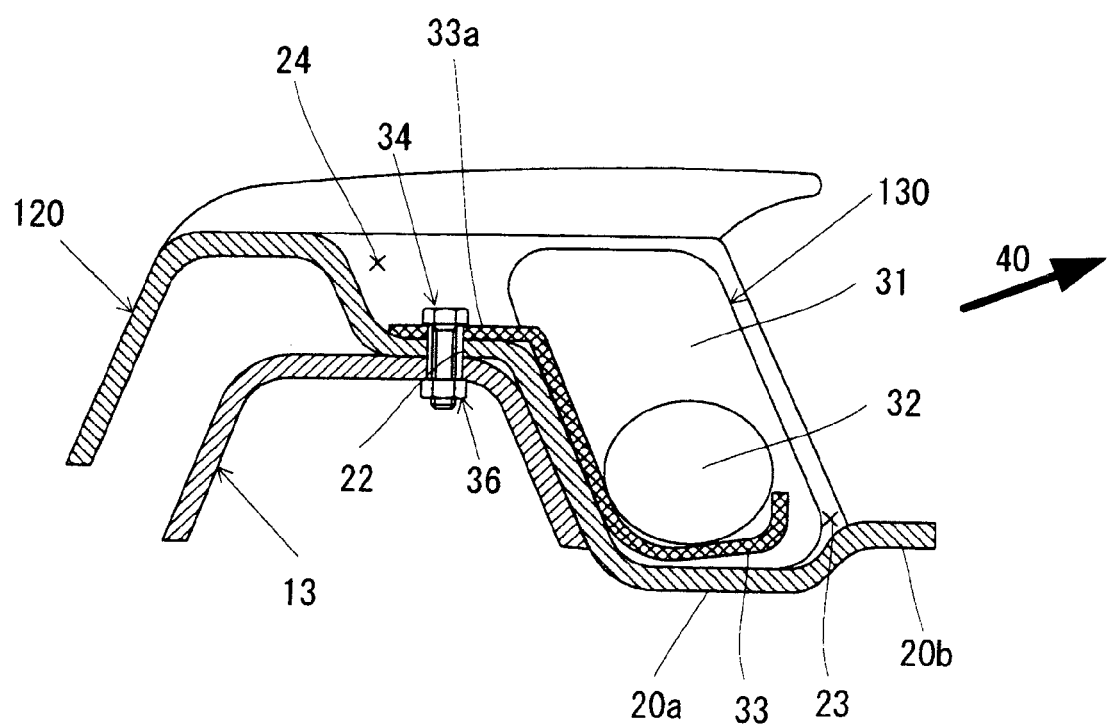
FIG. 9 is a cross-section along a line C-C in FIG. 8.
Figure 10:
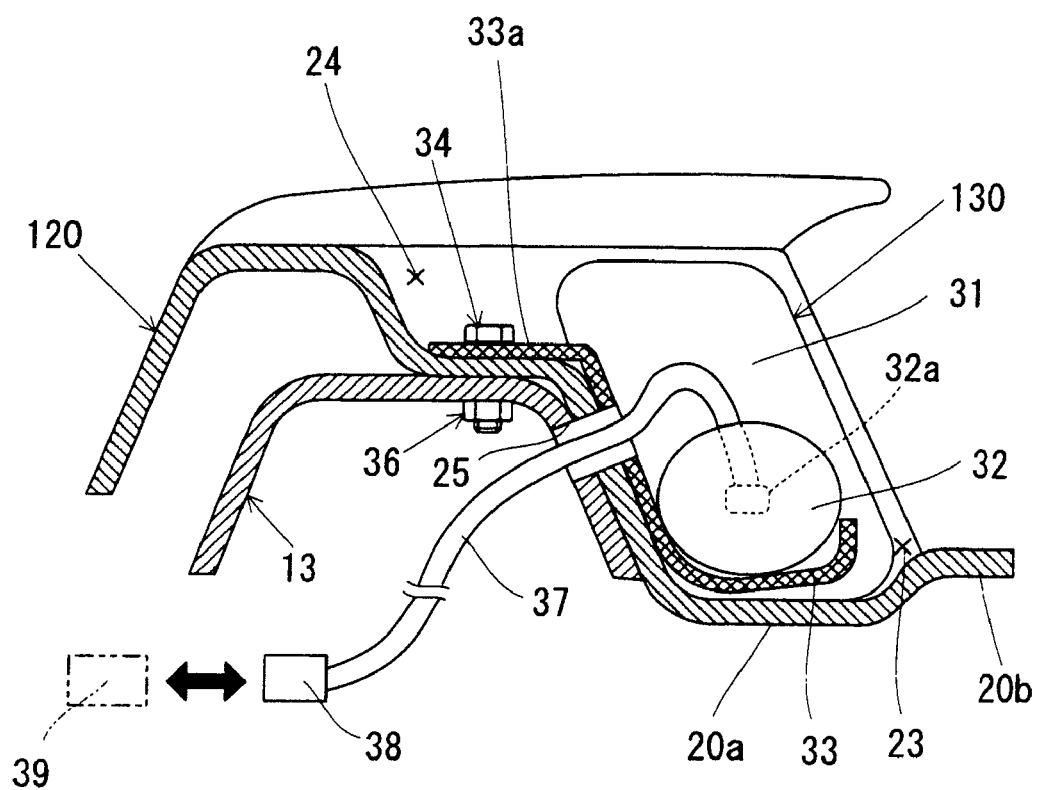
FIG. 10 is a cross-section along a line D-D in FIG. 8.

FIG. 8 is a perspective view showing a construction of a seat pan 120 and an airbag module 130 according to another embodiment, FIG. 9 is a cross-section along a line C-C, in FIG. 8, and FIG. 10 is a cross-section along a line D-D, in FIG. 8.

Although the seat pan 120 in the embodiment shown in FIG. 8 is provided with a housing portion 21 similar to the seat pan 20, the seat pan 120 is constructed to be further provided with a left-and-right pair of housing portions, 24 and 24. On the other hand, as shown in FIG. 9, in the airbag module 130 housed in the housing portion 21, a left-and-right pair of brackets 33a for bolts 34, is provided in a retainer 33. Each bracket 33a for bolt 34 is fastened to the seat pan 120 and a bracket 13 together and fixed thereto with a fixing bolt 34 and a nut 36 in a condition of being housed in each of the housing portions, 24 and 24. In the airbag module 130, the developing direction of an airbag 31 developing and extending at the time when the accident occurs is configured to be diagonally upward toward the rear side as indicated by a direction of an arrow 40 in FIG. 9, similar to the case of the airbag module 30.

Figure 11:
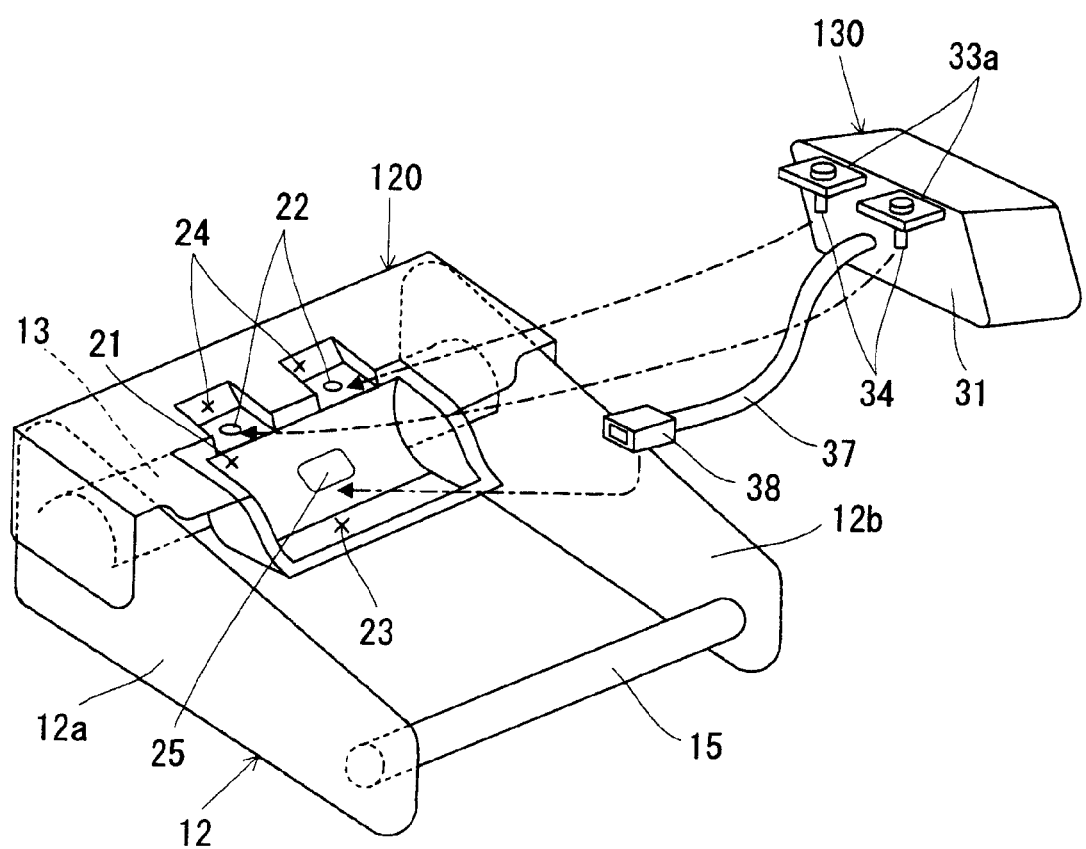
FIG. 11 is a perspective view schematically showing a work for housing an airbag module 130 into a housing portion 21 of a seat pan 120 according to another embodiment.

At this moment, FIG. 11 is a perspective view schematically showing a work for housing the airbag module 130 according to another embodiment in the housing portion 21 of the seat pan 120. As shown in FIG. 11, in the housing work for the airbag module 130, firstly, the airbag module 130 is moved to the housing portion 21 in a manner so as for the fixing bolt 34 at the airbag module 130 side to be headed to the housing portion 24 of the seat pan 120. Further, a harness 37 is inserted into the through-hole 25 of the housing portion 21 from a vehicle-side connector portion 38 side, i.e., the tip end of the harness 37. In the present embodiment, since the construction is formed such that the through-hole 25 is provided in the housing portion 21, the harness 37 can be inserted into the through-hole 25 along the operation for housing the airbag module 130 in the housing portion 21, and the elongated harness 37 hard to interfere the assembling work thereafter. Further, it is enabled to be aimed at facilitating the assembling work for the airbag module 130. Furthermore, a condition in which the retainer 33, the seat pan 120, and the bracket 13 are fastened together and fixed to each other is formed by fastening the fixing bolt 34 and the nut 36 to each other after the fixing bolt 34 is inserted into a through-hole 22 penetrating the seat pan 120 and the bracket 13.

Figure 12:
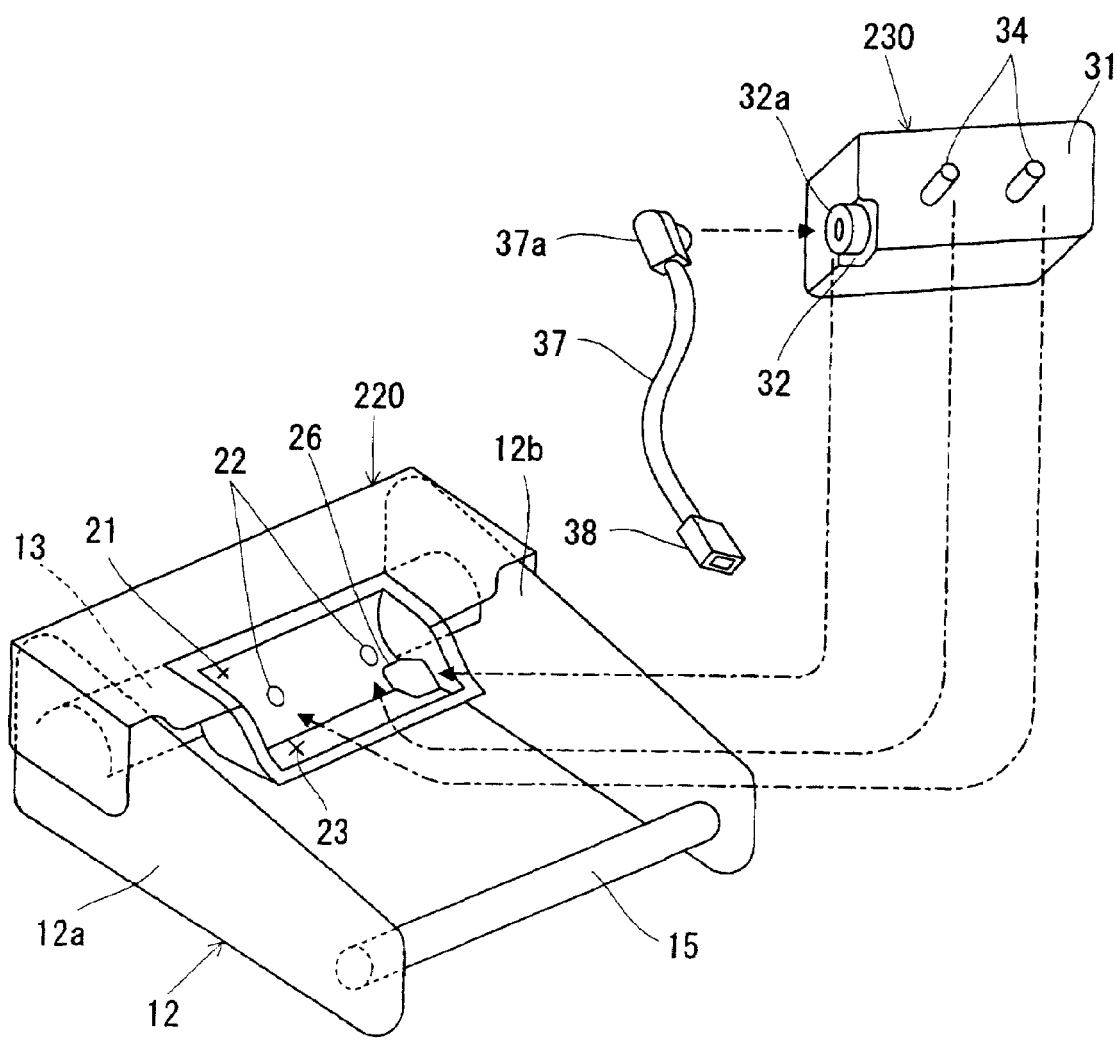
FIG. 12 is a perspective view schematically showing a work for housing an airbag module 230 into a housing portion 21 of a seat pan 220 according to another embodiment.

Moreover, in the aforementioned embodiment, although a case that the through-hole 25 to which the harness 37 is inserted is provided in the housing portion of the seat pan, is described, in the present invention, a construction in which an opening for inserting a member other than the harness 37 is provided in the housing portion of the seat pan can also be adopted. With regard to the construction, explanation is made referring to FIG. 12. FIG. 12 is a perspective view schematically showing the work for housing an airbag module 230 according to another embodiment in a housing portion 21 of a seat pan 220.

The airbag module 230, shown in FIG. 12 has a construction in which a gas-generator-side connector portion 32a of a gas generator 32 is exposed to an outer surface of the airbag module 230 passing through a penetrating portion of an airbag 31, in addition to a construction similar to the airbag module 30. On the other hand, in this embodiment, a through-hole 26 (sometimes called as a "notched hole") serving as an opening portion penetrating through the seat pan 220 and a bracket 13 is provided at a corner portion of the housing portion 21 of the seat pan 220. This embodiment is constructed such that a gas-generator-side connector portion 32a is inserted into the through-hole 26 at the time of assembling work for assembling the airbag module 230 with the vehicle main body. Further, the through-hole 26 is constructed to be a portion allowing the gas-generator-side connector portion 32a to be expanded toward outside of the seat pan 220 while being in close contact with the bracket 13. The through-hole 26 corresponds to an "opening portion" in the present invention.

In such a construction described above, when the airbag module 230 is housed in the housing portion 21 of the seat pan 220, the gas-generator-side connector portion 32a is exposed to a wall surface (rear surface) at an opposite side of a housing wall surface of the housing portion 21 through the through-hole 26. Accordingly, it is enabled for a connector 37a of a harness 37 to be easily connected to the gas-generator-side connector portion 32a from an outside of the seat pan 220. Although not shown in the drawings, a holding member (for example, a clip or the like) for holding the harness 37 at side frames, 12a and 12b, can also be provided as needed.

Incidentally, in the present embodiment, it is preferable for the through-hole 26 to make a design for an opening square measure to be suppressed as much as possible within a limit not to interfere a smooth inserting work for a vehicle-side connector portion 38 and the harness 37. According to such a construction described above, the airbag-expansion gas generated by the activation of the gas generator 32 is enabled to be suppressed to be leaked from a space partitioned by the housing portion 21 and the airbag cover (illustration is omitted) that covers the housing portion 21 toward an outside of the space, as much as possible.

Further, in the aforementioned embodiment, although a case that the through-holes, 25 and 26, provided in a penetrating manner at a wall surface of the housing portion 21 of the seat pan is used as an opening portion is described, in the present invention, the structure of the opening portion is not limited to a configuration of a through hole, but other opening configurations, such as for example, a notched opening provided in a notched manner, a slit, a groove, or the like can be adopted.

Moreover, in the aforementioned embodiment, although a construction of the vehicle seat 100 that is constructed as a driver's seat in which a driver is seated, or a passenger seat is explained, the characteristic part of the present invention can also be applied to a construction of various types of vehicle seats including the driver's seat or a passenger seat, for example, a rear seat. In the motor vehicle in this case, various types of motor vehicles moving with vehicle occupants taken on, such as automobiles, airplanes, boats and ships, electric trains, buses, trucks, and so forth are included.

What is claimed is:

1. An airbag device in combination with a vehicle seat, the combination comprising:
   a seat frame including a base frame and a back frame;
   an elongate bracket member extending between and connected at either end thereof to the side frame members to extend below the seat pan;
   a seat pan for supporting a seat cushion;
   an airbag arranged to be deployed for lifting the seat cushion;
   a gas generator for supplying inflation gas to the airbag;
   a housing portion of the seat pan configured for receiving the airbag and the gas generator;
   a signal transmission device for transmitting an electrical activation signal to the gas generator including an elongate harness having an enlarged end connector portion;
   an opening in the seat pan housing portion configured and sized to fit the enlarged end connector portion of the signal transmission device therethrough;
   an opening in the elongate bracket member configured and sized to fit the enlarged end connector portion of the signal transmission device therethrough;
   a fastening device that attaches the seat pan to the bracket member to be tightly engaged thereagainst so that the openings of the seat pan housing portion and the bracket member are aligned forming a through hole that extends in an axial direction and which has a length in the axial direction that is minimized due to the tight engagement between the seat pan housing portion and the bracket member to allow for easy insertion of the elongate harness including the enlarged end connector portion thereof therethrough; and
   a sealing member sized to fit in the through hole and for extending about the elongate harness extending through the through hole in close contact therewith to keep moisture from accessing the seat pan housing portion.

2. The combination of claim 1 wherein the airbag and the gas generator are in an airbag module including a retainer, the seat pan housing portion includes a wall portion to which the retainer is fastened, and the opening of the seat pant housing portion for the signal transmission device portion is in the wall portion.

3. The combination of claim 1 wherein the signal transmission device portion comprises a connector of the gas generator, and the elongate harness has a connector at one end thereof opposite the enlarged end connector portion for being connected to the gas generator connector.

4. The combination of claim 1 wherein the housing portion of the seat pan comprises a recessed well in the seat pan in which the airbag and gas generator are received, and the opening of the seat pan housing portion is at a corner of the recessed well.

5. The combination of claim 4 wherein the bracket member extends adjacent to the recessed well for providing support thereto during airbag deployment.

6. The combination of claim 1 wherein the airbag and the gas generator are in an airbag module, the seat pan housing portion includes another opening,
   the bracket member extending along the seat pan housing portion for providing support thereto during airbag deployment and having another opening aligned with the other opening of the seat pan housing portion, and
   the fastening device includes a fastener associated with the airbag module and received through the aligned other openings for securing the airbag module, the seat pan, and the support member together.

* * * * *

UNITED STATES PATENT AND TRADEMARK OFFICE
CERTIFICATE OF CORRECTION

| | | |
|---|---|---|
| PATENT NO. | : 7,611,195 B2 | Page 1 of 1 |
| APPLICATION NO. | : 11/678241 | |
| DATED | : November 3, 2009 | |
| INVENTOR(S) | : Hiromichi Yoshikawa et al. | |

It is certified that error appears in the above-identified patent and that said Letters Patent is hereby corrected as shown below:

In the Claims

Column 13, Line 26, delete "theretbrough" and insert -- therethrough --.

Column 14, Line 8, delete "pant" and insert -- pan --.

Signed and Sealed this

Sixteenth Day of March, 2010

David J. Kappos
*Director of the United States Patent and Trademark Office*